United States Patent
Masutani

(10) Patent No.: US 6,267,695 B1
(45) Date of Patent: Jul. 31, 2001

(54) GOLF BALL

(75) Inventor: Yutaka Masutani, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 09/335,902

(22) Filed: Jun. 18, 1999

(30) Foreign Application Priority Data

Jun. 18, 1998 (JP) .................................................. 10-188294

(51) Int. Cl.$^7$ .............................. A63B 37/04; A63B 37/06
(52) U.S. Cl. ........................ 473/377; 473/367; 473/368; 473/371; 473/374; 473/377; 473/378; 473/600; 473/601; 473/602
(58) Field of Search ...................................... 473/367, 368, 473/371, 374, 377, 378, 600, 601, 602

(56) References Cited

U.S. PATENT DOCUMENTS

| | | | |
|---|---|---|---|
| 698,516 | * 4/1902 | Kempshall | 473/370 |
| 720,852 | * 2/1903 | Smith . | |
| 790,252 | * 5/1905 | Mahaut . | |
| 1,482,232 | * 1/1924 | Hazeltine | 473/377 |
| 1,524,171 | * 1/1925 | Chatfield . | |
| 1,855,448 | * 4/1932 | Hazeltine . | |
| 2,055,326 | * 9/1936 | Young . | |
| 2,376,085 | 5/1945 | Radford et al. . | |
| 4,203,941 | * 5/1980 | Brooker | 264/250 |
| 4,229,401 | * 10/1980 | Pocklington | 264/248 |
| 4,367,873 | * 1/1983 | Chang et al. | 473/602 |
| 5,407,341 | * 4/1995 | Endo | 425/116 |
| 5,439,227 | 8/1995 | Egashira et al. . | |
| 5,490,674 | 2/1996 | Hamada et al. . | |
| 5,556,098 | * 9/1996 | Higuchi et al. | 473/373 |
| 5,692,973 | 12/1997 | Dalton . | |
| 5,782,702 | * 7/1998 | Yamagishi et al. | 473/280 |
| 5,820,485 | * 10/1998 | Hwang | 473/361 |
| 5,830,086 | * 11/1998 | Hayashi | 473/376 |
| 5,836,834 | * 11/1998 | Matsutani et al. | 473/374 |
| 6,033,611 | * 3/2000 | Yamaguchi | 264/250 |

* cited by examiner

Primary Examiner—Allan N. Shoap
Assistant Examiner—Paul D Kim
(74) Attorney, Agent, or Firm—Sughrue, Mion, Zinn, Macpeak & Seas, PLLC

(57) ABSTRACT

The invention provides a golf ball comprising a core and a cover, wherein the cover consists of an outer layer and an inner layer having a lower hardness than the outer layer. The cover inner layer is formed with a plurality of recesses in its outer surface and the cover outer layer is formed over the cover inner layer in such a manner that the cover outer layer penetrates into the recesses in the cover inner layer to form protrusions. The sum of the cross-sectional areas of the protrusions at their base accounts for 2–45% of the surface area of an imaginary smooth cover inner layer. The protrusions have a height corresponding to 30–100% of the thickness of the cover inner layer where no recesses are formed. The ball receives a reduced spin and travel a distance upon driver shots, but receives an increased spin and is easy to control upon iron or sand wedge shots.

24 Claims, 1 Drawing Sheet

GOLF BALL

This invention relates to a golf ball comprising a core, a cover inner layer, and a cover outer layer, and more particularly, to such a golf ball in which the cover outer layer penetrates into the cover inner layer to form protrusions therein.

BACKGROUND OF THE INVENTION

A variety of studies and proposals have been made to find a good compromise between flight distance and "feel" of golf balls. For solid golf balls comprising a solid core and a cover, one common approach is to construct the core and the cover into multilayer structures for adjusting their hardness and dimensions (including diameter and gage).

For example, U.S. Pat. No. 5,439,227 discloses a three-piece golf ball comprising a core, a cover inner layer and a cover outer layer, the cover outer layer being harder than the cover inner layer. U.S. Pat. No. 5,490,674 discloses a three-piece golf ball comprising a solid core of inner and outer layers and a cover, the core inner layer being harder than the core outer layer.

While the respective layers of most golf balls define smooth spherical surfaces, the golf balls disclosed in U.S. Pat. Nos. 2,376,085 and 5,692,973 have a core which is provided with outwardly extending protrusions for preventing the core from being offset during injection molding of the cover therearound. The protrusions in these golf balls are substitutes for the support pins used during injection molding. These patents do not attempt to positively utilize the shape effect of support pin-substituting protrusions, but rather intend to avoid incorporation of a distinct material in the cover, by forming the protrusions from the same material as the cover.

Recently, JP-A 9-285565 proposes a two-piece solid golf ball in which the solid core and cover, or adjoining layers of a multilayer solid core or adjoining layers of a multilayer cover are provided with irregularities. When hit, the ball gives a different feel to the player, depending on the loft angle of the particular club with which it is struck. This golf ball is improved in feel, but insufficient in flight performance and spin. There is however, room for further improvement.

SUMMARY OF THE INVENTION

An object of the invention is to provide a golf ball comprising a core, a cover inner layer and a cover outer layer wherein the cover inner layer is formed with recesses and the cover outer layer is formed with protrusions fitted in the recesses, thereby achieving a soft feel, a low spin rate when hit with a small loft angle club, good flight performance, and good control when hit with an iron or sand wedge.

It is well known from the study of strength of materials that a beam or column supporting an axial compressive load gives rise to the buckling phenomenon that as the load increases, uniform compression becomes unstable and is shifted laterally whereby the beam is bent. The invention has been made by applying the buckling phenomenon to a golf ball. Specifically, when columns or protrusions of different hardness are distributed in a surface-adjoining region of a ball undergoing a large amount of deformation, specifically the cover inner layer, the behavior of vertical and horizontal components of the deformation that the ball undergoes upon impact is made different from conventional balls. Then the dependency on club of initial conditions (especially spin rate) of the ball can be adjusted as desired.

The invention provides a golf ball comprising a core and a cover enclosing the core, wherein the cover consists essentially of an outer layer and an inner layer having a lower hardness than the outer layer, the cover inner layer is formed with a plurality of recesses in its outer surface and the cover outer layer is formed over the cover inner layer in such a manner that the cover outer layer penetrates into the recesses in the cover inner layer to form convex protrusions. It has been found that the sum of the cross-sectional areas of the protrusions at their base and the height of the protrusions in a normal direction should be in specific ranges; or the protrusions of the cover outer layer fitted in the recesses in the cover inner layer should satisfy a specific relationship to the thickness of the cover outer layer. The construction where the protrusions on the cover outer layer are fitted in the recesses in the cover inner layer in an optimum manner has the following advantages. For driver shots, due to the relationship between a high head speed and a small loft angle, the impact force has a greater vertical component relative to the club face so that the protrusions embedded within the cover inner layer give rise to a buckling phenomenon (the ball is liable to collapse), which provides a reduced spin rate and an increased launch angle, resulting in a drastically increased carry. For short iron shots, due to the loft angle, the impact force has a greater horizontal component relative to the club face. Since the protrusions within the cover inner layer do not give rise to a buckling phenomenon except for the vertical component, satisfactory spin performance is obtained.

In a first aspect, the invention provides a golf ball comprising a core and a cover enclosing the core, wherein the cover consists essentially of an outer layer and an inner layer having a lower hardness than the outer layer, the cover inner layer is formed with a plurality of recesses in its outer surface and the cover outer layer is formed over the cover inner layer in such a manner that the cover outer layer penetrates into the recesses in the cover inner layer to form protrusions, the sum of the cross-sectional areas of the protrusions at their base accounts for 2 to 45% of the surface area of the cover inner layer provided that the cover inner layer is not formed with the recesses, and the protrusions have a height in a normal direction of at least 30% of the thickness of the cover inner layer where no recesses are formed.

In a second aspect, the invention provides a golf ball comprising a core, a cover inner layer and a cover outer layer, wherein the cover outer layer has a higher hardness than the cover inner layer, the cover inner layer is formed with a plurality of recesses in its outer surface and the cover outer layer is formed over the cover inner layer in such a manner that the cover outer layer penetrates into the recesses in the cover inner layer to form protrusions, the protrusions of the cover outer layer fitted in the recesses in the cover inner layer satisfy the following relationship:

$$0.2T < 2\sqrt{\frac{A}{N} \times \frac{1}{\pi}} < 5T$$

wherein A is the sum (mm$^2$) of the cross-sectional areas of the protrusions at their base, N is the number of protrusions, and T is the thickness (mm) of the cover outer layer where no protrusions are formed.

When the ball is struck at a relatively high club head speed as with a driver so that the ball is given a large impact force, that force acts to cause the protrusions to buckle. On the other hand, when the ball is struck at a relatively low head speed as with a short iron so that the ball is given a small impact force, the protrusions do not buckle. In the former case of large impact force, the protrusions buckle so that the strength of the protrusions of the cover outer layer embedded in the cover inner layer does not substantially act and only the strength of the cover inner layer formed softer than the protrusions contributes. This results in a reduced spin rate and an increased carry. In the latter case of small impact force, the protrusions do not buckle so that the strength of the cover inner layer in a substantial sense is a combination of the strength of the cover inner layer in itself and the strength of the protrusions embedded therein, that is, higher than the strength of the cover inner layer in itself by a value attributable to the protrusions of higher hardness. Then the cover inner layer exhibits a harder behavior, leading to an increased spin rate.

The golf ball comprising the cover inner and outer layers with the outer layer protrusions fitted in the inner layer recesses according to the invention exerts the optimum flight performance and controllability for a particular club used because the cover inner layer having protrusions embedded therein exhibits a different behavior depending on the magnitude of impact force and the loft angle or number of a golf club.

DESCRIPTION OF PREFERRED EMBODIMENTS

Figure 1:
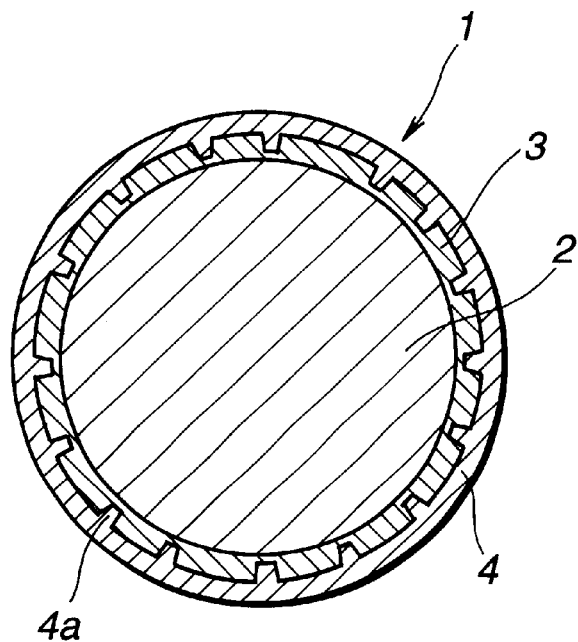
FIG. 1 is a schematic cross-sectional view of a golf ball according to one embodiment of the invention.

Referring to FIG. 1, a golf ball according to the invention, designated at 1, is illustrated as comprising a solid core 2, a cover inner layer 3 enclosing the core 2, and a cover outer layer 4 enclosing the inner layer 3. All of these components are disposed in a concentric fashion.

The solid core 2 is formed of a rubber composition primarily comprising a base rubber containing polybutadiene rubber, polyisoprene rubber, natrual rubber or silicne rubber as a main component. For higher resilience, #polybutadiene rubber is preferable. The polybutadiene used herein is preferably one containing at least 40% of cis structure. In the base rubber, another rubber component such as natural rubber, polyisoprene rubber or styrene-butadiene rubber may be blended with the polybutadiene if desired. Since a higher proportion of polybutadiene rubber provides a higher resilience, the other rubber component should preferably be less than about 10 parts by weight per 100 parts by weight of polybutadiene.

In the rubber composition, a crosslinking agent may be blended with the rubber component. Exemplary crosslinking agents are zinc and magnesium salts of unsaturated fatty acids such as zinc methacrylate and zinc acrylate, and esters such as trimethylpropane methacrylate. Of these, zinc acrylate is preferred because it can impart high resilience. The crosslinking agent is preferably used in an amount of about 15 to 40 parts by weight per 100 parts by weight of the base rubber. A vulcanizing agent such as dicumyl peroxide is usually blended in the rubber composition, preferably in an amount of about 0.1 to 5 parts by weight per 100 parts by weight of the base rubber. In the rubber composition, zinc oxide or barium sulfate is blended as an antioxidant or specific gravity adjusting filler if desired. The amount of filler blended is preferably about 5 to 130 parts by weight per 100 parts by weight of the base rubber.

One preferred formulation of the solid core-forming rubber composition is given below.

|  | Parts by weight |
| --- | --- |
| Cis-1,4-polybutadiene | 100 |
| Zinc oxide | 5 to 40 |
| Zinc acrylate | 15 to 40 |
| Barium sulfate | 0 to 40 |
| Peroxide | 0.1 to 5.0 |

Vulcanizing conditions include a temperature of 150±10° C. and a time of about 5 to 20 minutes.

The rubber composition is obtained by kneading the above-mentioned components in a conventional mixer such as a Banbury mixer, kneader or roll mill. The resulting compound is molded in a core-shape mold by injection or compression molding.

The solid core 2 is preferably made to a relatively large diameter of 28 to 38 mm, more preferably 30 to 37 mm. A core with a diameter of less than 28 mm would provide less resilience with a possible reduction of flight distance. With a core diameter of more than 38 mm, the cover inner layer which must accommodate the protrusions of the cover outer layer therein cannot be made sufficiently thick, with a possibility that the protrusion-recess engagement become less effective.

Preferably the core undergoes a deflection of 1.8 to 5.0 mm, more preferably 2.5 to 4.5 mm under a load of 100 kg. The weight of the core is usually about 12 to about 35 grams. The core is usually formed to a single layer structure from one material although it may also be formed to a multilayer structure of two or more layers of different materials if desired.

The material of which the cover inner layer 3 is made is not critical and may be either a resinous material or a rubbery material insofar as it is relatively soft. Resinous materials having good impact resistance are preferably used. Exemplary resins include polyester elastomers, ionomer resins, styrene elastomers, urethane resins, hydrogenated butadiene rubber and mixtures thereof. Use may be made of commercially available ionomer resins such as Himilan from Mitsui Dupont Polychemical K.K. and Surlyn from E. I. Dupont, and polyester elastomers such as Hytrel from Toray Dupont K.K.

The cover inner layer preferably has a Shore D hardness of 10 to 55, more preferably 15 to 40. If the cover inner layer has a Shore D hardness of more than 55, the difference in hardness from the cover outer layer becomes smaller with a possibility that the embedment of cover outer layer protrusions in the cover inner layer become less effective. With a cover inner layer hardness of less than 10 in Shore D, the golf ball as a whole would become less resilient.

According to the invention, the cover inner layer is formed around the core by conventional injection or compression molding. It is preferred that the cover inner layer is formed in its outer surface with recesses at the same time as it is molded. Specifically, the cavity of a mold for forming the cover inner layer is formed on its inner surface with a plurality of protrusions corresponding to the plurality of recesses. This mold enables that the cover inner layer having a plurality of recesses in its outer surface be formed by conventional injection molding. In some cases, after a smooth cover inner layer is formed around the core, recesses can be formed in the inner layer by engraving, drilling or any other means. Except for the recesses thus formed, the remaining area of the cover inner layer defines a substantially spherical surface. Within the recesses, the convex protrusions of the cover outer layer are formed as will be described below.

According to the invention, the cover outer layer material is molded around the cover inner layer having a plurality of recesses in its outer surface by conventional injection or compression molding, whereby the cover outer layer having protrusions embedded in the cover inner layer is formed.

Any of well-known cover stocks may be used in forming the cover outer layer 4. The cover outer layer material may be selected from ionomer resins, polyurethane resins, polyester resins and balata rubber, with the ionomer resins being preferred. Use may be made of commercially available 3.0 mm, between its base and its top. The shape of the protrusions is not critical and they may be formed to any suitable shape such as cylinder, cone, prism, pyramid, frusto-cone or frusto-pyramid.

The protrusions of the cover outer layer fitted in the recesses in the cover inner layer each have a cross-sectional area at their base. The cross section of each protrusion at its base has a size (which is an average diameter of cylindrical protrusions or an average width of prism-shaped protrusions) of preferably 0.5 to 4.0 mm, more preferably 0.5 to 3.0 mm, and most preferably 1.0 to 3.0 mm.

The sum of the cross-sectional areas of all the protrusions at their base should account for 2 to 45%, preferably 3 to 43%, more preferably 3 to 40%, and most preferably 3 to 30% of the surface area of the cover inner layer provided that the cover inner layer is not formed with the recesses (differently stated, the surface area of an imaginary sphere circumscribing the cover inner layer). If the sum of protrusion areas is less than 2% of the surface area of the smooth cover inner layer, the number or proportion of protrusions embedded in the cover inner layer is too small for the protrusions to exert their effect. If the sum of protrusion areas is more than 45% of the surface area of the smooth cover inner layer, the number or proportion of protrusions in the cover inner layer is too large, failing to achieve the effect of the invention.

Figure 2:
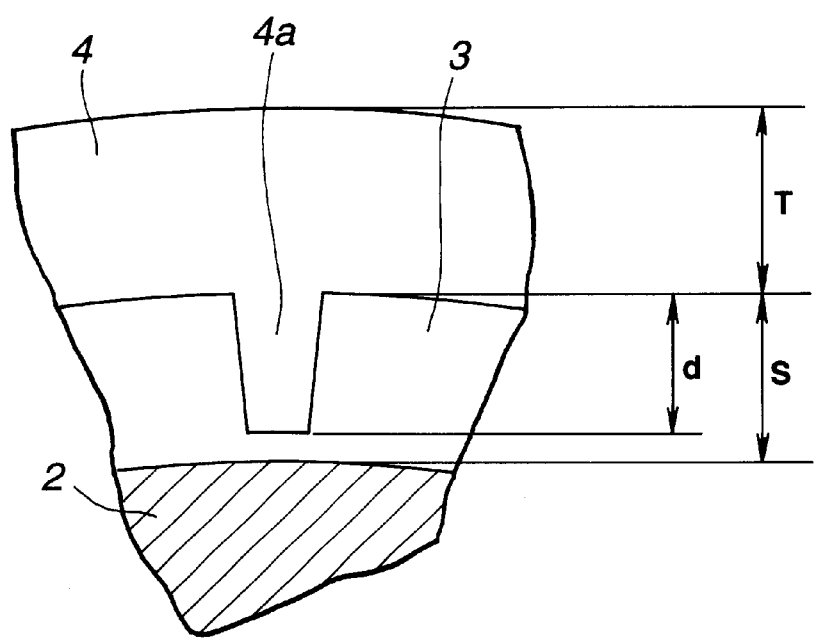
FIG. 2 is an enlarged view of the protrusion-recess engagement between the cover outer and inner layers.

As best shown in FIG. 2, the protrusion 4a has a height d in a normal direction to the imaginary spherical surface (or in a radial direction), and the cover inner layer has a thickness S where no recesses are formed. The proportion of the height d of the protrusion to the thickness S of the cover inner layer, that is, $(d/S) \times 100$, should be at least 30%. preferably 50 to 100%, more preferably 60 to 100%, and most preferably 70 to 100%. Protrusions with a height/thickness value of less than 30% ionomer resins such as Surlyn from E. I. Dupont and Himilan from Mitsui Dupont Polychemical K.K.

Additives such as titanium dioxide and barium sulfate may be added to the cover stock for adjusting the specific gravity and other properties thereof. Other optional additives include UV absorbers, antioxidants, and dispersants such as metal soaps. The cover outer layer may have a single layer structure of one material or be formed to a multilayer structure from layers of different materials.

The cover outer layer (excluding the protrusions embedded in the recesses in the cover inner layer) preferably has a thickness of 0.5 to 4.0 mm, more preferably 1.0 to 3.0 mm, and a Shore D hardness of 40 to 70, more preferably 50 to 65. The cover outer layer should be harder than the cover inner layer. The difference in hardness between the cover outer layer and the cover inner layer should preferably be at least 5, more preferably 5 to 45, most preferably 10 to 45 Shore D units. If the cover outer layer is softer than the cover inner layer, effective deformation of the protrusions would not occur.

In the golf ball of the invention, as shown in FIGS. 1 and 2, the cover inner layer 3 is uniformly formed in its surface with a plurality of recesses, and the cover outer layer 4 penetrates into the recesses to form convex protrusions 4a therein.

The total number of protrusions embedded in the cover inner layer (or the total number of recesses in the cover inner layer) is generally 60 to 600, preferably 80 to 500, and more preferably 90 to 400. It is preferred that the protrusions be distributed on the cover inner layer surface in a predetermined regular pattern. Any well-known dimple arrangement such as regular octahedaral or icosahedral arrangement is applicable to the distribution of the recesses or protrusions. Each protrusion preferably has a height or length of 0.8 to 3.5 mm, more preferably 1.0 to are unlikely to buckle, so that the effect of protrusions embedded in the cover inner layer is little exerted.

The thickness S of the cover inner layer where no recesses are formed is preferably 0.8 to 3.5 mm, especially 1.2 to 3.0 mm.

Also as shown in FIG. 2, the cover outer layer has a thickness T where no protrusions are formed, and the cross-sections of protrusions at their base have an average diameter D (which is simply a diameter if all the protrusions are identical). The proportion of the average diameter D of the cross-sections of protrusions at their base to the thickness T of the cover outer layer, that is, $(D/T) \times 100$, is preferably 20 to 500% (0.2 to 5 times), more preferably 30 to 300% (0.3 to 3 times). Outside this range, the protrusions embedded in the cover inner layer would become less effective, failing to achieve the objects of the invention. If the cross-sectional shape of protrusions is not circular, the diameter of a circle having substantially the same area as the cross-sectional area is determined.

In the second aspect of the invention, the protrusions 4a of the cover outer layer 4 fitted in the recesses in the cover inner layer 3 and the thickness T of the cover outer layer satisfy the following relationship:

$$0.2T < 2\sqrt{\frac{A}{N} \times \frac{1}{\pi}} < 5T$$

preferably, $$0.5T < 2\sqrt{\frac{A}{N} \times \frac{1}{\pi}} < 3T$$

wherein A is the sum (mm$^2$) of the cross-sectional areas of the protrusions at their base, N is the number of protrusions, which is equal to the above-described total number of protrusions, and T is the thickness (mm) of the cover outer layer where no protrusions are formed. If the protrusions and the cover outer layer thickness do not satisfy the above relationship, the effects of the invention are not achieved.

There has been described a golf ball wherein the cover inner layer is formed with a plurality of recesses and the cover outer layer having a higher hardness than the cover inner layer penetrates into the recesses so that convex protrusions of the harder cover outer layer are embedded within the softer cover inner layer. When the ball is struck with a driver or club having a smaller loft angle at a relatively high head speed, the protrusions embedded in the cover inner layer buckle so that the ball may undergo a substantial deformation, leading to a drastic increase in flight distance by virtue of the reduced back spin and increased launch angle. On the other hand, when the ball is struck with a short iron or sand wedge at a relatively low head speed, the protrusions embedded in the cover inner layer do not buckle so that the ball is restrained from deformation, which provides an increased back spin and maintains ease of control.

As to performance, the golf ball of the invention, when hit with iron and sand wedge clubs, exhibits excellent spin properties and ease of control whereas when hit with a driver having a small loft angle, the ball is increased in carry and total distance on account of the reduced spin rate and increased launch angle.

The golf ball of this invention has a multiplicity of dimples in its surface. The ball on its surface is subject to finishing treatments such as painting and stamping, if necessary. The golf ball as a whole preferably has a hardness corresponding to a deflection of 2.6 to 4.5 mm, more preferably 2.8 to 3.8 mm, under a load of 100 kg. The golf ball must have a diameter of not less than 42.67 mm and a weight of not greater than 45.93 grams in accordance with the Rules of Golf.

EXAMPLE

Examples of the invention are given below by way of illustration and not by way of limitation.

Examples 1–5 & Comparative Examples 1–6

Solid cores were formed by working a rubber composition of the formulation shown below in a kneader and molding and vulcanizing it in molds at a temperature of 155° C. for about 15 minutes.

| Core composition | Parts by weight |
| --- | --- |
| JSR BR01 | 50 |
| JSR BR11 | 50 |
| Zinc oxide | 30 |
| Dicumyl peroxide | 1.2 |
| Zinc acrylate | 18 |

Note that JSR BR01 and BR11 are polybutadiene rubbers by Japan Synthetic Rubber K.K.

Cover inner layers were formed around the cores by kneading resin compositions of the formulation shown in Table 1 and injection molding them in molds. The combination of core and cover inner layer is shown in Table 2. Cover outer layers were formed around the cover inner layers by injection molding cover stocks of the formulation shown in Table 1. The combination of cover outer layer with other components is shown in Table 2. Subsequent conventional painting yielded three-piece golf balls of Examples 1–5 and Comparative Examples 1–6.

The cover inner layer-forming molds used in Examples 1–5 and Comparative Examples 1–4 had a plurality of projections distributed on their cavity-defining inner surface in a regular octahedral arrangement and corresponding to the protrusions reported in Table 2. At the same time as molding of the cover inner layer, it was formed with a plurality of recesses in its surface. At the same time as molding of the cover outer layer, it penetrates into the recesses whereby the protrusions from the cover outer layer were embedded in the cover inner layer. The shape and variants of the protrusions are shown in Table 2.

These golf balls were examined for hardness, flight performance and spin by the following tests. The results are shown in Table 2.

Ball hardness

Hardness is expressed by a deflection (mm) under a load of 100 kg.

Flight performance

Using a swing robot (Miyamae K.K.), the golf ball was struck with a driver (Tour Stage X100 with a loft angle of 10°, by Bridgestone Sports Co., Ltd.) at a head speed of 45 m/sec (W#1/HS45). An initial velocity, carry, and total distance were measured.

Spin

Using a swing robot (Miyamae K.K.), the golf ball was struck with different clubs at different head speeds. A spin rate was measured.

(1) driver (Tour Stage X100 with a loft angle of 10°, by Bridgestone Sports Co., Ltd.) at heat speed 50 m/sec (W#1/HS50)
(2) driver (the same as above) at head speed 45 m/sec (W#1/HS45)
(3) No. 5 iron (Tour Stage X1000, by Bridgestone Sports; Co., Ltd.) head speed 40 m/sec (I#5/HS40)
(4) sand wedge (Tour Stage X1000, by Bridgestone Sport:s Co., Ltd.) head speed 25 m/sec (SW/HS25)

TABLE 1

| Cover composition | A | B | C | D |
| --- | --- | --- | --- | --- |
| Hytrel 4047 | 100 | | | |
| Hytrel 3078 | | 100 | | |
| Surlyn 8120 | | | 65 | |
| Himilan 1855 | | | 35 | |
| Himilan 1605 | | | | 50 |
| Himilan 1706 | | | | 50 |
| Shore D hardness | 40 | 30 | 51 | 65 |

Note that Hytrel is the trade name of thermoplastic polyester elastomer by Toray Dupont K.K.; Surlyn is the trade name of ionomer resin by E. I. Dupont; and Himilan is the trade name of ionomer resin by Mitsui Dupont Polychemical K.K.

TABLE 2

| | | Example | | | | |
| --- | --- | --- | --- | --- | --- | --- |
| | | 1 | 2 | 3 | 4 | 5 |
| Core | Diameter (mm) | 34.8 | 34.8 | 34.8 | 34.8 | 34.5 |
| | Weight (g) | 27.5 | 27.5 | 27.5 | 27.5 | 27 |
| | Hardness[1] (mm) | 2.9 | 2.9 | 2.9 | 2.9 | 2.9 |

TABLE 2-continued

| | | | | | | |
|---|---|---|---|---|---|---|
| Cover inner layer | Composition | B | A | C | B | A |
| | Thickness S (mm) | 2.3 | 1.7 | 2.0 | 2.5 | 1.5 |
| | Shore D hardness | 30 | 40 | 51 | 30 | 40 |
| Cover outer layer | Composition | C | C | D | D | D |
| | Thickness T (mm) | 1.6 | 2.25 | 1.9 | 1.4 | 2.55 |
| | Shore D hardness | 51 | 51 | 65 | 65 | 65 |
| Protrusions | Number N | 150 | 420 | 60 | 180 | 420 |
| | Height d (mm) | 1.15 | 1.7 | 2.0 | 1.2 | 1.0 |
| | Shape | cylinder | cone | quadrangular pyramid | cone | quadrangular prism |
| | Cross-section diameter[2] (mm) | 0.98 | 2.04 | 1.74 | 3.98 | 2.40 |
| | Cross-sectional area (mm$^2$) | 0.75 | 3.27 | 2.36 | 12.44 | 4.52 |
| | Height/ thickness[3] (%) | 50 | 100 | 100 | 48 | 67 |
| | Area proportion[4] (%) | 2 | 30 | 3 | 45 | 43 |
| | Parameter[5] | 0.610 | 0.908 | 0.913 | 2.843 | 0.941 |
| Golf ball | Weight (g) | 45.18 | 45.28 | 45.3 | 45.1 | 45.31 |
| | Diameter (mm) | 42.6 | 42.7 | 42.6 | 42.6 | 42.6 |
| | Hardness (mm) | 3.15 | 3.02 | 2.79 | 2.5 | 3.0 |
| Flight performance W#1/HS45 | Initial velocity (m/s) | 76.9 | 77.01 | 77.1 | 77.05 | 76.95 |
| | Carry (m) | 214.9 | 215.6 | 216.7 | 217.1 | 216.3 |
| | Total (m) | 223.5 | 221.4 | 228.2 | 230 | 229.6 |
| Spin rate (rpm) | W#1/HS50 | 2401 | 2385 | 2320 | 2200 | 2281 |
| | W#1/HS45 | 2356 | 2290 | 2224 | 2125 | 2089 |
| | I#5/HS40 | 5418 | 5320 | 5120 | 5013 | 4932 |
| | SW/HS25 | 4890 | 4801 | 4697 | 4672 | 4492 |

| | | Comparative Example | | | | | |
|---|---|---|---|---|---|---|---|
| | | 1 | 2 | 3 | 4 | 5 | 6 |
| Core | | 34.8 | 34.5 | 34.8 | 34.5 | 36.7 | 36.7 |
| | | 27.5 | 27 | 27.5 | 27.5 | 29 | 29 |
| | | 2.9 | 2.9 | 2.9 | 2.9 | 2.9 | 2.9 |
| Cover inner layer | | C | A | B | A | C | A |
| | | 1.7 | 2.7 | 1.9 | 1.5 | 2.1 | 1.7 |
| | | 51 | 40 | 30 | 40 | 51 | 40 |
| Cover outer layer | | D | C | D | C | D | D |
| | | 2.25 | 1.4 | 2.05 | 2.55 | 0.9 | 1.3 |
| | | 65 | 51 | 65 | 51 | 65 | 65 |
| Protrusions | | 50 | 60 | 420 | 150 | — | — |
| | | 0.85 | 1.2 | 0.5 | 0.4 | — | — |
| | | quadrangular prism | cone | cylinder | cylinder | — | — |
| | | 1.41 | 7.14 | 0.40 | 4.15 | — | — |
| | | 1.56 | 40.01 | 0.12 | 13.55 | — | — |
| | | 50 | 44 | 26 | 27 | — | — |
| | | 1.7 | 48 | 1.1 | 46 | — | — |
| | | 0.626 | 5.098 | 0.193 | 1.629 | — | — |
| Golf ball | | 45.03 | 45.28 | 45.2 | 45.32 | 45.3 | 45.28 |
| | | 42.7 | 42.7 | 42.7 | 42.6 | 42.7 | 42.7 |
| | | 2.8 | 3.03 | 3.2 | 3.05 | 2.85 | 2.5 |
| Flight performance W#1/HS45 | | 77.03 | 77.12 | 76.92 | 76.95 | 77.13 | 76.95 |
| | | 213.3 | 214 | 213.1 | 213.8 | 213.5 | 213.2 |
| | | 220.8 | 218 | 218.3 | 217.3 | 220 | 219.5 |

TABLE 2-continued

| Spin rate | 2623 | 2890 | 2650 | 2826 | 2590 | 2643 |
|---|---|---|---|---|---|---|
| (rpm) | 2480 | 2690 | 2451 | 2649 | 2435 | 2469 |
| | 5135 | 5409 | 4960 | 5309 | 5043 | 4879 |
| | 4680 | 4816 | 4275 | 4759 | 4423 | 4326 |

[1] a deflection (mm) under a load of 100 kg
[2] When the cross section of protrusions is not circular, the cross-section diameter is the diameter of a circle of the same area.
[3] (protrusion height d)/(cover inner layer thickness S) × 100
[4] (sum of cross-sectional areas of protrusions at their base)/(surface area of imaginary smooth cover inner layer) × 100
[5]
$$\frac{2\sqrt{\frac{A}{N\pi}}}{T}$$

A: the sum (mm$^2$) of the cross-sectional areas of the protrusions at their base
N: the number of protrusions
T: the thickness (mm) of the cover outer layer excluding the protrusions It is evident from Table 2 that as compared with the comparative golf balls, the golf balls within the scope of the invention receive less spin when hit with a driver and equal or greater spin when hit with No. 5 iron or sand wedge, on account of which the inventive golf balls are drastically increased in carry and total distance while their ease of control is equal or superior to that of the comparative golf balls.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A golf ball comprising; a core and a cover enclosing the core, wherein said cover consists essentially of an outer layer and an inner layer having a lower hardness than the outer layer, the cover inner layer made of a resinous material and is formed with a plurality of recesses in its outer surface and the cover outer layer is formed over the cover inner layer in such a manner that the cover outer layer penetrates into the recesses in the cover inner layer to form protrusions, the sum of the cross-sectional areas of the protrusions at their base accounts for 2 to 45% of the surface area of the cover inner layer where the cover inner layer is spherical and not formed with the recesses, and the protrusions have a height in a normal direction of at least 30% of the thickness of the cover inner layer where no recesses are formed.

2. The golf ball of claim 1 wherein the cross-sections of the protrusions at their base have an average diameter of 0.5 to 4.0 mm.

3. The golf ball of claim 1 wherein the thickness of the cover inner layer where no recesses are formed is 0.8 to 3.5 mm.

4. The golf ball of claim 1 wherein the cover outer layer has a Shore D hardness of 40 to 70 and the cover inner layer has a Shore D hardness of 10 to 55, the hardness difference therebetween being at least 5 Shore D units.

5. The golf ball of claim 1, wherein said core is a solid core having a diameter in the range of 28 to 38 mm.

6. The golf ball of claim 1, wherein said core has a deflection in the range of 1.8 to 5.0 mm under a load of 100 kg.

7. The golf ball of claim 1, wherein said cover outer layer has a thickness in the range of 1.0 to 3.0 mm and a Shore D hardness in the range of 50 to 65.

8. The golf ball of claim 1, wherein the number of protrusions is in the range of 60 to 600.

9. The golf ball of claim 1, wherein each protrusion has a height of 0.8 to 3.5 mm.

10. The golf ball of claim 1 wherein the protrusions of the cover outer layer fitted in the recesses in the cover inner layer satisfy the following relationship:

$$0.2T < 2\sqrt{\frac{A}{N} \times \frac{1}{\pi}} < 5T$$

wherein A is the sum (mm$^2$) of the cross-sectional areas of the protrusions at their base, N is the number of protrusions, and T is the thickness (mm) of the cover outer layer where no protrusions are formed.

11. The golf ball of claim 1 wherein the cover inner layer is selected from the group consisting of polyester elastomers, ionomer resins, styrene elastomers, urethane resins and mixtures thereof.

12. The golf ball of claim 1 wherein the cover outer layer is selected from the group consisting of ionomer resins, polyurethane resins, and polyester resins.

13. A golf ball comprising; a core, a cover inner layer and a cover outer layer, wherein said cover outer layer has a higher hardness than the cover inner layer, the cover inner layer is formed with a plurality of recesses in its outer surface and the cover outer layer is formed over the cover inner layer in such a manner that the cover outer layer penetrates into the recesses in the cover inner layer to form protrusions, the protrusions of the cover outer layer fitted in the recesses in the cover inner layer made of a resinous material and satisfy the following relationship:

$$0.2T < 2\sqrt{\frac{A}{N} \times \frac{1}{\pi}} < 5T$$

wherein A is the sum (mm$^2$) of the cross-sectional areas of the protrusions at their base, N is the number of protrusions, and T is the thickness (mm) of the cover outer layer where no protrusions are formed.

14. The golf ball of claim 13 wherein the cross-sections of the protrusions at their base have an average diameter of 0.5 to 4.0 mm.

15. The golf ball of claim 13 wherein the cover inner layer has a thickness of 0.8 to 3.5 mm where no recesses are formed.

16. The golf ball of claim 13 wherein the thickness of the cover outer layer where no protrusions are formed is 0.5 to 4.0 mm.

17. The golf ball of claim 13 wherein the cover outer layer has a Shore D hardness of 40 to 70 and the cover inner layer has a Shore D hardness of 10 to 55, the hardness difference therebetween being at least 5 Shore D units.

18. The golf ball of claim 13, wherein said core is a solid core having a diameter in the range of 28 to 38 mm.

19. The golf ball of claim 13, wherein said core has a deflection in the range of 1.8 to 5.0 mm under a load of 100 kg.

20. The golfball of claim 13, wherein said cover outer layer has a thickness in the range of 1.0 to 3.0 mm and a Shore D hardness in the range of 50 to 65.

21. The golfball of claim 13, wherein the number of protrusions is in the range of 60 to 600.

22. The golfball of claim 13, wherein each protrusion has a height of 0.8 to 3.5 mm.

23. The golf ball of claim 13 wherein the cover inner layer is selected from the group consisting of polyester elastomers, ionomer resins, styrene elastomers, urethane resins and mixtures thereof.

24. The golf ball of claim 13 wherein the cover outer layer is selected from the group consisting of ionomer resins, polyurethane resins, and polyester resins.

* * * * *